United States Patent
Shimizu

(10) Patent No.: US 12,338,410 B2
(45) Date of Patent: Jun. 24, 2025

(54) LUBRICATING AGENT SOLUTION, MAGNETIC DISK AND METHOD FOR MANUFACTURING SAME

(71) Applicant: Moresco Corporation, Kobe (JP)

(72) Inventor: Tsuyoshi Shimizu, Kobe (JP)

(73) Assignee: Moresco Corporation, Kobe (JP)

( * ) Notice: Subject to any disclaimer, the term of this patent is extended or adjusted under 35 U.S.C. 154(b) by 133 days.

(21) Appl. No.: 17/632,474

(22) PCT Filed: May 28, 2020

(86) PCT No.: PCT/JP2020/021229
§ 371 (c)(1),
(2) Date: Feb. 2, 2022

(87) PCT Pub. No.: WO2021/024585
PCT Pub. Date: Feb. 11, 2021

(65) Prior Publication Data
US 2022/0275305 A1    Sep. 1, 2022

(30) Foreign Application Priority Data

Aug. 6, 2019 (JP) .................................. 2019-144650

(51) Int. Cl.
*C10M 173/02* (2006.01)
*C10M 107/38* (2006.01)
(Continued)

(52) U.S. Cl.
CPC ........ *C10M 173/02* (2013.01); *C10M 107/38* (2013.01); *G11B 5/7257* (2020.08); *C10M 2213/0606* (2013.01); *C10N 2040/18* (2013.01)

(58) Field of Classification Search
CPC .. G11B 5/7257; G11B 5/8408; C10M 173/02; C10M 173/00; C10M 107/38;
(Continued)

(56) References Cited

U.S. PATENT DOCUMENTS

| 6,093,495 A | 7/2000 | Falcone |
| 9,005,711 B2 * | 4/2015 | Riganti ................ C10M 171/06 427/358 |

FOREIGN PATENT DOCUMENTS

| JP | H09282642 A | 10/1997 |
| JP | 2001503179 A | 3/2001 |
| JP | 2013175279 A | 9/2013 |

OTHER PUBLICATIONS

Kasai et al., "Z-dol versus Z-tetraol: Bonding and durability in magnetic hard disk application", Tribology Letters, vol. 16, Nos. 1-2, Feb. 2004, pp. 29-36).*

(Continued)

*Primary Examiner* — Holly Rickman
(74) *Attorney, Agent, or Firm* — Harness Dickey & Pierce P.L.C.

(57) ABSTRACT

Provided is a lubricant solution capable of being applied to a magnetic disk without use of a fluorine solvent. A lubricant solution in accordance with an aspect of the present invention includes: water; and a perfluoropolyether compound that satisfies Expression (I) below:

$$N_{OH}/(Mn/1500) \geq 2 \qquad (1),$$

where $N_{OH}$ represents the number of hydroxyl groups per molecule of the perfluoropolyether compound and Mn represents a number average molecular weight of the perfluoropolyether compound.

10 Claims, 1 Drawing Sheet

(51) Int. Cl.
*G11B 5/725* (2006.01)
*C10N 40/18* (2006.01)

(58) Field of Classification Search
CPC ...... C10M 2213/0606; C10M 2213/06; C10N 2040/18
See application file for complete search history.

(56) References Cited

OTHER PUBLICATIONS

"Hydrogen bonding in lubricants for hard disk drives", Trib Lett vol. 21, No. 3, Mar. 2006, pp. 205-216 (Year: 2006).*
Lofti et al., "Molecular Dynamics Simulations of Perfluoropolyether Lubricant Degradation in the Presence of Oxygen, Water, and Oxide Nanoparticles using ReaxFF Reactive Force Field", J. Phys. Chem., Jan. 2018, pp. 2684-2695. (Year: 2018).*
International Search Report from corresponding PCT Application No. PCT/JP2020/021229 dated Aug. 11, 2020.
Written Opinion from corresponding PCT Application No. PCT/JP2020/021229 dated Aug. 11, 2020.
Office Action from corresponding JP Application No. 2021-537591 dated Feb. 21, 2023.

\* cited by examiner

LUBRICATING AGENT SOLUTION, MAGNETIC DISK AND METHOD FOR MANUFACTURING SAME

PRIORITY STATEMENT

This application is a national stage application under 35 U.S.C. § 371 of PCT International Application No. PCT/JP2020/021229, which has an international filing date of 28 May 2020 and claims priority under 35 U.S.C. § 119 to Japanese Patent Application No. 2019-144650 filed on 6 Aug. 2019. The contents of each application recited above are incorporated herein by reference in their entirety.

TECHNICAL FIELD

The present invention relates to a lubricating agent solution (lubricant solution), a magnetic disk, and a method for producing the same.

BACKGROUND ART

Many of the existing magnetic disks are constituted by: a recording layer disposed on a substrate; a protective layer disposed on the recording layer in order to protect information recorded on the recording layer; and a lubricant layer disposed on the protective layer.

Known conventional techniques for forming a lubricant layer of a magnetic disk include a technique of immersing a magnetic disk in a lubricant solution that contains a fluorine solvent as a solvent.

For example, Patent Literature 1 discloses using, as a lubricant solution, a solution obtained by dissolving, in a fluorine solvent, a perfluoropolyether compound which is a lubricant.

CITATION LIST

Patent Literature

[Patent Literature 1]
Japanese Patent Application Publication Tokukai No. 2013-175279

SUMMARY OF INVENTION

Technical Problem

There has been no other choice but to use a fluorine solvent as the solvent of a lubricant solution to be applied to magnetic disks. However, a fluorine solvent is subject to restrictions under Act on the Protection of the Ozone Layer Through the Control of Specified Substances and Other measures and Act of Promotion of Global Warming Countermeasures. A fluorine solvent places a high load on the environment and is therefore problematic.

An object of an aspect of the present invention is to provide a lubricant solution capable of being applied to magnetic disks without using a fluorine solvent.

Solution to Problem

The inventor of the present invention studied diligently to solve the above-described object, and eventually found that a perfluoropolyether compound having a number average molecular weight and including hydroxyl groups, the number average molecular weight and the number of the hydroxyl groups satisfying a particular expression, is soluble in water and that a lubricant solution obtained by dissolving the compound in water exhibits the same functionality as conventional lubricant solutions, and thereby complete the present invention. Specifically, the present invention includes the following configurations:

<1> A lubricant solution including: water; and a perfluoropolyether compound that satisfies Expression (I) below:

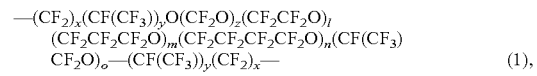

$$N_{OH}/(Mn/1500) \geq 2 \tag{I},$$

where $N_{OH}$ represents the number of hydroxyl groups contained per molecule of the perfluoropolyether compound and Mn represents a number average molecular weight of the perfluoropolyether compound.

<2> The lubricant solution according to <1>, wherein the perfluoropolyether compound has a structure of Formula (1) below:

$$-(CF_2)_x(CF(CF_3))_yO(CF_2O)_z(CF_2CF_2O)_l(CF_2CF_2CF_2O)_m(CF_2CF_2CF_2CF_2O)_n(CF(CF_3)CF_2O)_o-(CF(CF_3))_y(CF_2)_x- \tag{1},$$

where x is a real number of 0 to 3, y is a real number of 0 to 1, and z, l, m, n, and o are each a real number of 0 to 15 such that either x or y is a real number of not less than 1 and at least any one of z, l, m, n, and o is a real number of not less than 1.

<3> The lubricant solution according to <1> or <2>, wherein the perfluoropolyether compound is represented by Formula (2) below:

$$R^1-R^2-R^3 \tag{2},$$

where $R^2$ is an organic group having a perfluoropolyether skeleton, and $R^1$ and $R^3$ are organic groups, and include, independently of each other, a fluorine atom, a hydroxyl group, an alkyl halide group, an alkoxy group, a carboxyl group, an amino group, an ester group, an amide group, or an aryl group at respective terminals thereof.

<4> The lubricant solution according to any one of <1> to <3>, further including an organic solvent.

<5> The lubricant solution according to any one of <1> to <4>, wherein the lubricant solution contains a fluorine solvent in an amount of not more than 20 wt %.

<6> A magnetic disk including: a recording layer, a protective layer disposed on the recording layer; and a lubricant layer disposed on the protective layer, the lubricant layer including a lubricant solution according to any one of <1> to <5>.

<7> A method for producing a magnetic disk including a recording layer, a protective layer disposed on the recording layer, and a lubricant layer disposed on the protective layer, the method including a step of forming a lubricant layer by placing, on an exposed surface of the protective layer of a stack of the recording layer and the protective layer, a lubricant solution according to any one of <1> to <5>.

Advantageous Effects of Invention

With an aspect of the present invention, it is possible to provide a lubricant solution that is capable of applying a lubricant on magnetic disks without using a fluorine solvent.

DESCRIPTION OF EMBODIMENTS

Figure 1:
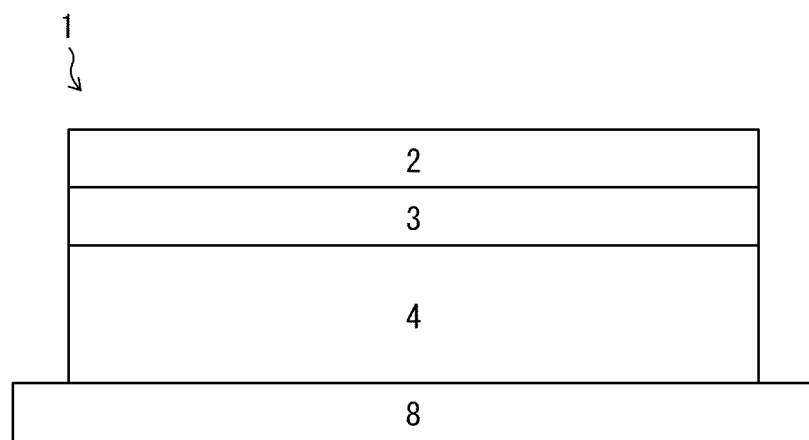
FIG. 1 is a cross-sectional view illustrating the configuration of a magnetic disk in accordance with an embodiment of the present invention.

The following description will discuss embodiments of the present invention in detail. Note, however, that the present invention is not limited to the following embodiments but can be altered within this disclosure. The present invention also encompasses, in its technical scope, any embodiment derived by combining technical means disclosed in differing embodiments. Note that the expression "A to B", representing a numerical range, herein means "not less than A and not more than B" unless otherwise specified in this specification.

[1. Lubricant Solution]

A lubricant solution in accordance with an embodiment of the present invention includes: water; and a perfluoropolyether compound that satisfies Expression (I) below:

$$N_{OH}/(Mn/1500) \geq 2 \qquad (I),$$

where $N_{OH}$ represents the number of hydroxyl groups contained per molecule of the perfluoropolyether compound and Mn represents the number average molecular weight of the perfluoropolyether compound.

In this specification, the lubricant solution means a solution obtained by dissolving a lubricant such as the perfluoropolyether compound in a solvent. In this specification, the number average molecular weight of the perfluoropolyether compound is a value as measured by $^{19}$F-NMR with the use of JNM-ECX400 available from JEOL Ltd. In the measurement by the NMR, a sample is used as a neat solution without being diluted with a solvent. A known peak corresponding to a part of the skeleton structure of the perfluoropolyether compound serves to substitute for the reference for a chemical shift.

For example, for a compound having a number average molecular weight of 2000 and including four hydroxyl group, 4/(2000/1500)=3.

As disclosed in Patent Literature 1, a solution obtained by dissolving a perfluoropolyether compound in a fluorine solvent has been conventionally used as a lubricant solution. The inventor of the present invention found that a perfluoropolyether compound satisfying Expression (I) is soluble in water during the synthesis and purification of a perfluoropolyether compound including a polyvalent hydroxyl group. This finding was surprising because conventional common perfluoropolyether compounds are insoluble in water. The inventor of the present invention further found that in a case of using a lubricant solution obtained by dissolving the perfluoropolyether compound that satisfies Expression (I) in water or a mixed solvent of water and an organic solvent, it is possible to obtain a lubricant layer having a thickness equal to or greater than those of lubricant layers obtained in a case of using the conventional lubricant solutions obtained by using a fluorine solvent. The lubricant solution, which eliminates the need to use a fluorine solvent, is inexpensive and places low load on the environment.

The inventor of the present invention also considered partially replacing a fluorine solvent with a solvent other than a fluorine solvent in order to reduce load on the environment. The inventor of the present invention then found that, when a perfluoropolyether compound is dissolved in a mixed solvent of a fluorine solvent and alcohol, it is difficult to form a lubricant layer. Also from this perspective, it is surprising that a lubricant solution obtained by dissolving the above-described perfluoropolyether compound in a solvent other than a fluorine solvent enables the formation of a lubricant layer having an adequate thickness.

In this specification, the "thickness of a lubricant layer" is evaluated by using FT-IR (VERTEX70 available from Bruker). In this specification, whether a solvent places "high load on the environment" is evaluated on the basis of global warming potential (GWP) published by the Intergovernmental Panel on Climate Change (IPCC).

In this specification, a perfluoropolyether compound refers to a compound having a perfluoropolyether skeleton, i.e., a skeleton in which fluorocarbons are linked via an ether linkage. Examples of the perfluoropolyether skeleton include a structure represented by, for example, Formula (1) below:

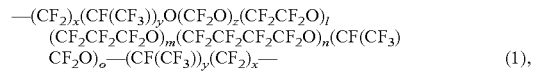

where x is a real number of 0 to 3, y is a real number of 0 to 1, and each of z, l, m, n, and o is a real number of 0 to 15 such that either x or y is a real number of not less than 1 and at least any one of z, l, m, n, and o is a real number of not less than 1.

Examples of Formula (1) include Demnum skeleton: —CF$_2$CF$_2$O—(CF$_2$CF$_2$CF$_2$O)$_m$CF$_2$CF$_2$—, Fomblin skeleton: —CF$_2$O—(CF$_2$O)$_z$(CF$_2$CF$_2$O)$_l$CF$_2$—, C2 skeleton: —CF$_2$O—(CF$_2$CF$_2$O)$_l$CF$_2$—, C4 skeleton: —CF$_2$CF$_2$CF$_2$O—(CF$_2$CF$_2$CF$_2$CF$_2$O)$_n$CF$_2$CF$_2$CF$_2$—, and Krytox skeleton: CF(CF$_3$)O—(CF(CF$_3$)CF$_2$O)$_o$CF(CF$_3$)—. In these skeletons, each of z, l, m, n, and o is a real number of 1 to 15. In Fomblin skeleton, CF$_2$O and CF$_2$CF$_2$O are randomly repeated.

The perfluoropolyether compound preferably has, in a molecule thereof, at least one structure represented by Formula (1). The perfluoropolyether compound may therefore have, in the molecule thereof, two or more structures represented by Formula (1). In that case, the two or more structures represented by Formula (1) may be bonded via any organic group. Examples of the organic group include an aliphatic hydrocarbon group and an aromatic hydrocarbon group. The aliphatic hydrocarbon group and the aromatic hydrocarbon group may each include an ether linkage and/or a hydroxyl group.

The perfluoropolyether compound is represented by, for example, Formula (2) below:

where R$^2$ represents an organic group having a perfluoropolyether skeleton. R$^2$ is the perfluoropolyether skeleton represented by Formula (1), and the two or more structures represented by Formula (1) may be bonded via any organic group, as described above.

R$^1$ and R$^3$ are organic groups, and include, independently of each other, a fluorine atom, a hydroxyl group, an alkyl halide group, an alkoxy group, a carboxyl group, an amino group, an ester group, an amide group, or an aryl group at respective terminals. For example, R$^1$ and R$^3$ are each, independently of each other, —F, —CH$_2$OH, —CH$_2$OCH$_2$CH(OH)CH$_2$OH, —CH$_2$OCH$_2$CH(OH)CH$_2$OCH$_2$CH(OH)CH$_2$OH, —CH$_2$O(CH$_2$)$_g$OH, —CH$_2$OCH$_2$CH(OH)CH$_2$OC$_{12}$H$_9$O, —CH$_2$OCH$_2$CH(OH)CH$_2$OC$_{10}$H$_7$, or CH$_2$OCH$_2$CH(OH)CH$_2$OC$_6$H$_4$—R$^4$. In these formulae, g is a real number of 1 to 10, and examples of R$^4$ include a hydrogen atom, a hydroxyl group, an alkoxy group including one to four carbon atoms, an amino group, and an amide residue. R$^4$ is preferably a hydroxyl group or an alkoxy group.

Examples of a perfluoropolyether compound in which two or more perfluoropolyether skeletons are bonded via any organic group include a compound represented by Formula (3) below.

  (3), where each of $R^5$ and $R^7$ is an organic group having a perfluoropolyether skeleton, and is, for example, the perfluoropolyether skeleton represented by Formula (1).

$R^6$ is any organic group. Examples of $R^6$ include an aliphatic hydrocarbon group and an aromatic hydrocarbon group. The aliphatic hydrocarbon group and the aromatic hydrocarbon group may include an ether linkage and/or a hydroxyl group.

$R^1$ and $R^3$ are each an organic group similar to that for Formula (2).

The number average molecular weight of the perfluoropolyether compound is not limited to any particular value but is preferably 500 to 6000, and more preferably 1000 to 4000. Further, the number of hydroxyl groups per molecule of the perfluoropolyether compound is not limited but is preferably 1 to 10, more preferably 2 to 8, and even more preferably 4 to 8.

The concentration of the perfluoropolyether compound in the lubricant solution is preferably 0.001 wt % to 0.1 wt %, more preferably 0.005 wt % to 0.05 wt %, and even more preferably 0.005 wt % to 0.01 wt %. For example, the above-described concentration may be 0.1 g/L to 15 g/L, or may be 0.7 g/L to 1.5 g/L.

The lubricant solution contains at least water as a solvent, and may further contain an organic solvent so that the solubility of the perfluoropolyether compound in water is enhanced. The organic solvent in this specification means an organic solvent that contains no fluorine atom. Examples of the organic solvent include alcohols, ketones, ethers, dimethyl sulfoxide, and dimethylformamide. Examples of the alcohols include methanol, ethanol, n-propyl alcohol, isopropyl alcohol, t-butanol, and n-butanol. Examples of the ketones include acetone, methyl ethyl ketone, and diethyl ketone. In particular, ketones are preferable.

The proportion of the organic solvent in the solvent of the lubricant solution is preferably not more than 50 vol %, more preferably not more than 40 vol %, and even more preferably not more than 30 vol %. The lower limit of the proportion of the organic solvent is not limited to any particular percentage but may be 5 vol %, or may be 10 vol %.

Although the lubricant solution preferably consists only of the perfluoropolyether compound and water, or consists only of the perfluoropolyether compound, water, and an organic solvent, the lubricant solution may contain other constituent. Examples of such other constituent include known lubricants for magnetic disks such as Fomblin (registered trademark) Zdol (available from Solvay Solexis), Ztetraol (available from Solvay Solexis), Demnum (registered trademark) (available from Daikin Industries, Ltd.), and Krytox (registered trademark) (available from DuPont), MORESCO PHOSFAROL A20H (available from MORESCO Corporation), and MORESCO PHOSFAROL D-4OH (available from MORESCO Corporation).

The lubricant solution contains a fluorine solvent in a proportion of preferably not more than 20 wt %, more preferably not more than 10 wt %, and even more preferably not more than 5 wt %. The lubricant solution most preferably contains a fluorine solvent in a proportion of 0 wt %, that is, the lubricant solution does not contain a fluorine solvent. In this specification, the fluorine solvent refers to a solvent that contains, as a constituent, a compound including a fluorine atom. Examples of the fluorine solvent include Vertrel-XF available from Chemours-Mitsui Fluoroproducts Co., Ltd., ASAHIKLIN AK-225G available from AGC, and Novec 7100 and Novec 7200 available from 3M.

The lubricant solution can be used as a lubricant for recording media, in order to improve the sliding properties of magnetic disks. The lubricant solution can also be used as a lubricant for recording media in other recording devices that involve sliding between a recording head and a recording medium (e.g., a magnetic tape) other than a magnetic disk. The lubricant solution can also be used as a lubricant for devices other than the recording devices that include a part involving sliding.

[2. Method for Producing Lubricant Solution]

A method, for producing the lubricant solution, in accordance with an embodiment of the present invention is not limited to any particular method. For example, the lubricant solution can be obtained by dissolving the above-described perfluoropolyether compound in water or a mixed solvent of water and an organic solvent.

The method for producing the above-described perfluoropolyether compound is not limited to any particular method as well. For example, the perfluoropolyether compound represented by Formula (2) can be obtained by, for example, allowing a linear fluoropolyether (a) including a hydroxyl group at a terminal thereof to react with, for example, glycidol, 2,2-dimethyl-4-(2,3-epoxy)propoxymethyl-1,3-dioxolane, and/or 3-(2-oxiranylmethoxy)-1,2-propanediol.

The linear fluoropolyether (a) is represented by $HOCH_2(CF_2)_x(CF(CF_3))_yO(CF_2O)_z(CF_2CF_2O)_l(CF_2CF_2CF_2O)_m(CF_2CF_2CF_2CF_2O)_n(CF_2CF(CF_3)O)_o—(CF(CF_3))_y(CF_2)_xCH_2OH$ that includes a structure represented by Formula (1). The definitions of x, y, z, l, m, n, and o are the same as those for Formula (1).

Specifically, examples of the linear fluoropolyether (a) include a compound represented by $HOCH_2CF_2O(CF_2O)_z(CF_2CF_2O)_lCF_2CH_2OH$, a compound represented by $HOCH_2CF_2O(CF_2CF_2O)_lCF_2CH_2OH$, a compound represented by $HOCH_2CF_2CF_2O(CF_2CF_2CF_2O)_mCF_2CF_2CH_2OH$, and a compound represented by $HOCH_2CF_2CF_2CF_2O(CF_2CF_2CF_2CF_2O)_nCF_2CF_2CF_2CH_2OH$. The linear fluoropolyether (a) typically has a number average molecular weight of 200 to 5000, and preferably has a number average molecular weight of 400 to 1500. The number average molecular weights are measured by a method similar to that for measuring the number average molecular weight of the above-described perfluoropolyether compound.

The linear fluoropolyether (a) is a compound having a molecular weight distribution, and has a molecular weight distribution (PD), given by the expression: weight average molecular weight/number average molecular weight, of preferably 1.0 to 1.5, more preferably 1.0 to 1.3, and even more preferably 1.0 to 1.1. Note that the molecular weight distribution is a property value obtained by using HPLC-8220GPC available from Tosoh Corporation, a column (PLgel Mixed E) available from Polymer Laboratories, a HCFC-based alternative for chlorofluorocarbons as an eluent, and a non-functional perfluoropolyether as a reference substance.

The perfluoropolyether compound represented by Formula (2) can be synthesized specifically by the following method. First, the linear fluoropolyether (a) including, at a terminal thereof, a hydroxyl group is allowed to react with glycidol or the like in the presence of a catalyst. The reaction temperature is preferably 20° C. to 90° C. and more preferably 60° C. to 80° C. The reaction time is preferably 5 hours to 20 hours and more preferably 10 hours to 18 hours. It is preferable to use glycidol or the like in an amount of 1 to 3 equivalents of the linear fluoropolyether (a) and use the catalyst in an amount of 0.01 to 0.5 equivalents of the linear fluoropolyether (a). Examples of the catalyst can include an alkaline compound such as sodium t-butoxide or potassium t-butoxide. The reaction can be carried out in a solvent. Examples of the solvent can include t-butyl alcohol, toluene, and xylene. Then, the resultant product of the reaction is, for example, washed with water and purified by silica gel chromatography. This yields, for example, the per compound represented by HOCH$_2$CH(OH)CH$_2$OCH$_2$CH(OH)CH$_2$OCH$_2$Cl$_2$F$_4$O(C$_3$F$_6$O)$_m$C$_2$F$_4$CH$_2$OCH$_2$CH(OH)CH$_2$OCH$_2$CH(OH)CH$_2$OH, which is Compound 1 in Example 1.

Further, the perfluoropolyether compound represented by Formula (3) is obtained by, for example, allowing the linear fluoropolyether (a) or a linear fluoropolyether (b) that includes an alkoxy group including, at one terminal thereof, a hydroxyl group and including, at the other terminal thereof, a hydroxyl group to react with an aliphatic hydrocarbon group (A) including two epoxy groups.

In a case of using the linear fluoropolyether (b), the synthesization can be carried out as follows. Specifically, in the first step, the linear fluoropolyether (a) is allowed to react with a compound (c), which reacts with a hydroxyl group to form an alkoxy group including a hydroxyl group. The reaction temperature is preferably 20° C. to 90° C. and more preferably 60° C. to 80° C. The reaction time is preferably 5 hours to 20 hours and more preferably 10 hours to 15 hours. It is preferable to use the compound (c) in an amount of 0.5 to 1.5 equivalents of the linear fluoropolyether (a). Then, purification is carried out by, for example, column chromatography so that the linear fluoropolyether (b) is obtained. This reaction can be carried out in a solvent. Examples of the solvent can include t-butyl alcohol, dimethyl formaldehyde, 1,4-dioxane, dimethyl sulfoxide, and dimethylacetamide. A reaction accelerator can be used in the reaction. Examples of the reaction accelerator can include a basic compound such as sodium, potassium t-butoxide, or sodium hydride.

Examples of the compound (c) can include a compound including an epoxy group and a haloalkyl alcohol represented by X(CH$_2$)$_p$OH, and a phenoxy compound (c-1) including an epoxy group.

Examples of the compound including an epoxy group can include glycidol, propylene oxide, glycidyl methyl ether, and isobutylene oxide.

In the haloalkyl alcohol represented by X(CH$_2$)$_p$OH, X represents a halogen atom such as chlorine, bromine, or iodine, and p is a real number of 2 to 8. Examples of the haloalkyl alcohol can include 2-chloroethanol, 3-chloropropanol, 4-chlorobutanol, 5-chloropentanol, 6-chlorohexanol, 7-chloroheptanol, 8-chlorooctanol, 2-bromoethanol, 3-bromopropanol, 4-bromobutanol, 5-bromopentanol, 6-bromohexanol, 7-bromoheptanol, 8-bromooctanol, 2-iodoethano, 3-iodopropanol, 4-iodobutano, 5-iodopentano, 6-iodohexanol, 7-iodoheptanol, and 8-iodooctanol.

Examples of the phenoxy compound including an epoxy group include a compound represented by Formula (c-1) below.

(c-1)

Examples of $R^4$ include a hydrogen atom, a hydroxyl group, an alkoxy group including one to four carbon atoms, an amino group, and an amide residue.

Examples of the alkoxy group including one to four carbon atoms can include a methoxy group, an ethoxy group, a propoxy group, and a butoxy group. Examples of the amino group can include an amino group, a methyl amino group, a dimethylamino group, an ethylamino group, and a diethylamino group. Examples of the amide residue can include an acetamide group (—NHCOCH$_3$) and a propionamide group (—NHCOC$_2$H$_5$).

Specific examples of the compound (c-1) can include glycidyl 4-methoxyphenyl ether, glycidyl 4-ethoxyphenyl ether, glycidyl 4-propoxyphenyl ether, glycidyl 4-butoxyphenyl ether, glycidyl 4-aminophenyl ether, glycidyl 4-methylaminophenyl ether, glycidyl 4-dimethylaminophenyl ether, glycidyl 4-ethylaminophenyl ether, glycidyl 4-diethylaminophenyl ether, glycidyl 4-Acetamidephenyl ether, and glycidyl 4-propionamidephenyl ether.

For example, in a case of using HOCH$_2$CF$_2$CF$_2$O(CF$_2$CF$_2$CF$_2$O)$_m$CF$_2$CF$_2$CH$_2$OH as the linear fluoropolyether (a) and using glycidol as the compound (c), both the substances react with each other to form HOCH$_2$CH(OH)CH$_2$OCH$_2$CF$_2$CF$_2$O(CF$_2$CF$_2$CF$_2$O)$_m$CF$_2$CF$_2$CH$_2$O H as the linear fluoropolyether (b).

For example, in a case of using HOCH$_2$CF$_2$CF$_2$O(CF$_2$CF$_2$CF$_2$O)$_m$CF$_2$CF$_2$CH$_2$OH as the linear fluoropolyether (a) and using the compound (c-1) as the compound (c), both the substances react with each other to form CH$_3$OC$_6$H$_4$OCH$_2$CH(OH)CH$_2$O CH$_2$CF$_2$CF$_2$O(CF$_2$CF$_2$CF$_2$O)$_m$CF$_2$CF$_2$CH$_2$OH as the linear fluoropolyether (b).

In the second step, the linear fluoropolyether (b) obtained in the first step or the linear fluoropolyether (a) is allowed to react with the aliphatic hydrocarbon group (A) so that the perfluoropolyether compound described above is synthesized.

For example, the linear fluoropolyether (b) obtained in the first step or the linear fluoropolyether (a) is allowed to react with the aliphatic hydrocarbon group (A) in the presence of a base. The reaction temperature is preferably 20° C. to 90° C. and more preferably 60° C. to 80° C. The reaction time is preferably 5 hours to 20 hours and more preferably 10 hours to 15 hours. It is preferable to use the aliphatic hydrocarbon group (A) in an amount of 0.5 to 1.5 equivalents of the linear fluoropolyether (a) or (b) and use a base in an amount of 0.5 to 2.0 equivalents of the linear fluoropolyether (a) or (b). Examples of the base can include sodium t-butoxide, potassium t-butoxide, sodium hydroxide, potassium hydroxide, and sodium hydride. The reaction can be carried out in a solvent. Examples of the solvent can include t-butanol, toluene, and xylene. Then, the resultant product of the reaction is, for example, washed with water and dehydrated. The perfluoropolyether compound represented by Formula (3) is thus obtained.

Specific examples of the aliphatic hydrocarbon group (A) can include 1,3-butadiene diepoxide, 1,4-pentadiene diepoxide, 1,5-hexadiene diepoxide, 1,6-heptadiene diepoxide, 1,7-octadiene diepoxide, 1,8-nonadiene diepoxide, 1,9-decane diepoxide, 1,10-undecane diepoxide, 1,11-dodecane diepoxide, and 1,1,1,1-tetra(glycidyloxymethyl)methane.

When the linear fluoropolyether (b) obtained in the first step is allowed to react with the aliphatic hydrocarbon group (A), it is possible to obtain a compound of which specific examples include $HOCH_2CH(OH)CH_2OCH_2CF_2CF_2O$ $(CF_2CF_2CF_2O)_mCF_2CF_2CH_2$—$OCH_2CH(OH)CH_2CH_2$ $CH_2CH_2CH(OH)CH_2O$—$CH_2CF_2CF_2O(CF_2CF_2CF_2O)_m$ $CF_2CF_2CH_2OCH_2CH(OH)CH_2OH$, $HOCH_2CH(OH)$ $CH_2OCH_2CF_2CF_2CF_2O(CF_2CF_2CF_2CF_2O)_nCF_2CF_2$ $CF_2CH_2$—$OCH_2CH(OH)CH_2CH_2CH_2CH_2CH(OH)$ $CH_2O$—$CH_2CF_2C$ $F_2CF_2O(CF_2CF_2CF_2CF_2O)_nCF_2CF_2$ $CF_2CH_2OCH_2CH(OH)CH_2OH$, and $HOCH_2CH(OH)$ $CH_2OCH_2Cl_2F_4O(C_3F_6O)_mCF_2CH_2OCH_2CH(OH)CH_2$ $CH_2CH_2CH(OH)CH_2OCH_2CF_2O(C_3F_6O)_mC_2F_4$ $CH_2OCH_2C$ $H(OH)CH_2OH$, which is Compound 2 in Example.

When the fluoropolyether (a) is allowed to react with the aliphatic hydrocarbon group (A), it is possible to obtain a compound of which specific examples include $HOCH_2CF_2CF_2O(CF_2CF_2CF_2O)_mCF_2CF_2CH_2$—$OCH_2CH$ $(OH)CH_2CH_2CH_2CH_2CH(OH)CH_2O$—$CH_2CF_2CF_2O$ $(CF_2CF_2CF_2O)_mCF_2CF_2CH_2OH$ and $HOCH_2CF_2CF_2O$ $(CF_2CF_2CF_2CF_2O)_mCF_2CF_2CF_2CH_2$—$OCH_2C$ $H(OH)$ $CH_2CH_2CH_2CH_2CH(OH)CH_2O$—$CH_2CF_2CF_2CF_2O$ $(CF_2CF_2CF_2CF_2O)_nCF_2CF_2CF_2CH_2OH$.

[3. Magnetic Disk]

A magnetic disk 1 in accordance with an embodiment of the present invention includes, as illustrated in FIG. 1, a recording layer 4, a protective film layer (protective layer) 3, and a lubricant layer 2 that are disposed on a non-magnetic substrate 8. The lubricant layer 2 contains the above-described lubricant solution.

Figure 2:
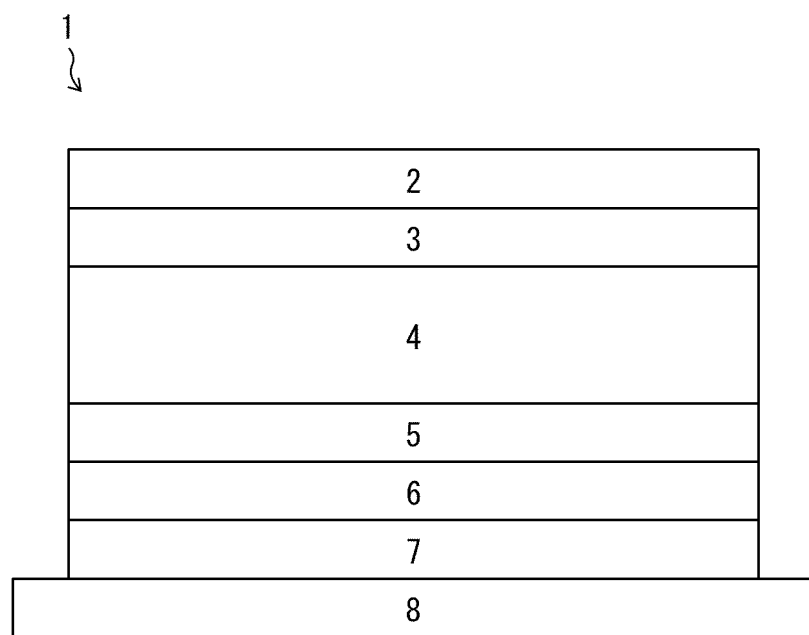
FIG. 2 is a cross-sectional view illustrating the configuration of a magnetic disk in accordance with an embodiment of the present invention.

In another embodiment, a magnetic disk can include, like the magnetic disk 1 illustrated in FIG. 2, a lower layer 5 that underlies the recording layer 4, one or more soft magnetic lower layers 6 that underlie the lower layer 5, and an adhesive layer 7 that underlies the one or more soft magnetic lower layers 6. In one embodiment, all these layers can be formed on the non-magnetic substrate 8.

Each of the layers of the magnetic disk 1 other than the lubricant layer 2 can contain a material that is known in this technical field to be suitable for a corresponding layer of a magnetic disk. Examples of the material of the recording layer 4 include: an alloy of an element (e.g., iron, cobalt, and nickel) from which a ferromagnetic material can be formed and chromium, platinum, tantalum or the like; and an oxide of the alloy. Examples of the material of the protective layer 3 include carbon, $Si_3N_4$, SiC, and $SiO_2$. Examples of the material of the non-magnetic substrate 8 include an aluminum alloy, glass, and polycarbonate.

[4. Method for Producing Magnetic Disk]

A method for producing a magnetic disk in accordance with an aspect of the present invention includes a step of forming a lubricant layer by placing a lubricant solution in accordance with an embodiment of the present invention on an exposed surface of a protective layer of a stack of a recording layer and the protective layer.

A method of forming a lubricant layer by placing a lubricant solution on an exposed surface of a protective layer of a stack of a recording layer and the protective layer is not limited to any particular method. The lubricant solution is preferably heated while being placed, i.e., being applied. The lubricant solution preferably has a temperature of 25° C. to 80° C. while being applied.

The following arrangement may be employed: the recording layer and the protective layer are formed in this order; the lubricant is placed on the exposed surface of the protective layer; and then ultraviolet irradiation or heat treatment is carried out.

The ultraviolet irradiation or heat treatment can form stronger bonds between the lubricant layer and the exposed surface of the protective layer and therefore prevents the lubricant from evaporating due to heating. When carrying out ultraviolet irradiation, it is preferable to use ultraviolet light having a dominant wavelength of 185 nm or 254 nm, in order to activate the exposed surface without affecting the lubricant layer and a deep area of the protective layer. The temperature of the heat treatment is preferably 60° C. to 170° C., more preferably 80° C. to 170° C., and even more preferably 80° C. to 150° C.

EXAMPLES

The following description will more specifically discuss the present invention based on Examples; however, the present invention is not limited to the following Examples. Note that the film thicknesses of the following Examples were evaluated by the following method.

[Film Thickness Evaluation on Lubricant Layer]

The film thickness of the lubricant layer was measured by using FT-IR (VERTEX70 available from Bruker).

Example 1

Compound 1 represented by the formula below was synthesized as follows:

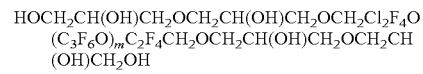

$HOCH_2CH(OH)CH_2OCH_2CH(OH)CH_2OCH_2Cl_2F_4O$
$(C_3F_6O)_mC_2F_4CH_2OCH_2CH(OH)CH_2OCH_2CH$
$(OH)CH_2OH$ 2,2-dimethyl-1,3-dioxolane-4-methanol (70 g), epichlorohydrin (100 g), tetrabutylammonium bromide (9 g), 50% NaOH aqueous solution (70 g), and n-hexane (350 g) were put in a reaction container, heated to 80° C., and stirred for three hours. A resultant reaction product was then washed with water and subsequently dehydrated, so that 60 g of an intermediate 1, (2,2-dimethyl-4-(2,3-epoxy)propoxymethyl-1,3-dioxolane), was obtained.

In an argon atmosphere, a mixture of t-butyl alcohol (65 g), perfluoropolyether (25 g) represented by $HOCH_2CF_2CF_2O(CF_2CF_2CF_2O)_mCF_2CF_2CH_2OH$, potassium t-butoxide (0.3 g), and the intermediate 1 (9.6 g) was stirred at 70° C. for 23 hours. A resultant reaction product was washed with water and then dehydrated. Methanol (100 g), water (11 g), and 60% nitric acid aqueous solution (0.4 g) were then added to this resultant reaction product, which was stirred for 39 hours. After this stirring, a resultant reaction product was washed with water, and then dehydrated, and purified by distillation, so that 20 g of Compound 1 was obtained. Identification results of Compound 1 by NMR are shown below.

$^{19}$F-NMR (solvent: none, reference substance: —$OCF_2CF_2CF_2O$— in the product [−129.7 ppm])

$\delta$=−129.7 ppm [11F, —$OCF_2CF_2CF_2O$—]

$\delta$=−84.1 ppm [22F, —$OCF_2CF_2CF_2O$—]

$\delta$=−124.0 ppm [4F, —$OCF_2CF_2CH_2OCH_2CH(OH)$ $CH_2OCH_2(OH)CH_2OH$, —$OCF_2CF_2CH_2OCH_2CH(OH)$ $CH_2OH$]

$\delta$=−86.4 ppm [4F, —$OCF_2CF_2CH_2OCH_2CH(OH)$ $CH_2OCH_2CH(OH)CH_2OH$, —$OCF_2CF_2CH_2OCH_2CH$ $(OH)CH_2OH$]

The results from $^{19}$F-NMR proved that m=5.5 as to Compound 1. Compound 1 was found to have a number average molecular weight of 1487; therefore, Noll/(Mn/1500)=6.1.

$^1$H-NMR (solvent: none, reference substance: D$_2$O)

δ=3.0 ppm to 4.4 ppm [24H, HOCH$_2$CH(OH)CH$_2$OCH$_2$CH(OH)CH$_2$OCH$_2$CF$_2$CF$_2$O(CF$_2$CF$_2$CF$_2$O)$_m$CF$_2$CF$_2$CH$_2$OCH$_2$CH(OH)CH$_2$OCH$_2$CH(OH)CH$_2$OH]

δ6=4.6 ppm [6H, HOCH$_2$CH(OH)CH$_2$OCH$_2$CH(OH)CH$_2$OCH$_2$CF$_2$CF$_2$O(CF$_2$CF$_2$CF$_2$O)$_m$CF$_2$CF$_2$CH$_2$O CH$_2$CH(OH)CH$_2$O CH$_2$CH(OH)CH$_2$OH]

Compound 1 thus obtained was dissolved in water at a concentration of 0.09 g/L, so that a lubricant solution in Example 1 was prepared. The lubricant solution was applied to a magnetic disk by the dip method. The temperature of the lubricant solution was set to 25° C., and the lubricant solution was applied under a condition of an immersion time of five minutes and the magnetic disk was pulled-up at a speed of 2 mm/sec.

Example 2

The lubricant solution obtained in Example 1 was applied to a magnetic disk in a manner similar to that for Example 1 except that the temperature of the lubricant solution was set to 80° C.

Example 3

Compound 1 was dissolved, at the same concentration as in Example 1, in a mixed solvent obtained by mixing water and acetone in a volume ratio of 50:50, so that a lubricant solution in Example 3 was prepared. The lubricant solution was applied to a magnetic disk in a manner similar to that for Example 1 except that the lubricant solution thus prepared was used.

Example 4

Compound 1 was dissolved, at the same concentration as in Example 1, in a mixed solvent obtained by mixing water and acetone in a volume ratio of 50:50, so that a lubricant solution in Example 4 was prepared. The lubricant solution was applied to a magnetic disk in a manner similar to that for Example 1 except that the temperature of the lubricant solution thus prepared was set to 50° C.

Example 5

Compound 2 represented by the formula below was synthesized as follows.

HOCH$_2$CH(OH)CH$_2$O CH$_2$Cl$_2$F$_4$O(C$_3$F$_6$O)$_m$CF$_2$CH$_2$O CH$_2$CH(OH)CH$_2$CH$_2$CH$_2$CH$_2$CH(OH)CH$_2$OCH$_2$Cl$_2$F$_4$O (C$_3$F$_6$O)$_m$C$_2$F$_4$CH$_2$OCH$_2$CH(OH)CH$_2$OH

In an argon atmosphere, a mixture of t-butyl alcohol (41 g), 95 g of perfluoropolyether (number average molecular weight: 1980, molecular weight distribution: 1.25) represented by HOCH$_2$CF$_2$CF$_2$O(CF$_2$CF$_2$CF$_2$O)$_m$CF$_2$CF$_2$CH$_2$OH, potassium t-butoxide (0.6 g), and glycidol (3.6 g) was stirred at 70° C. for 14 hours. After this stirring, a resultant reaction product was washed with water, then dehydrated, and purified by silica gel column chromatography, so that 95 g of perfluoropolyether (number average molecular weight: 2110) including one hydroxyl group at one terminal thereof and including two hydroxyl groups at the other terminal thereof. This perfluoropolyether (95 g) was dissolved in meta-xylene hexafluoride (95 g). Sodium hydroxide (3.0 g) and 1,7-octadiene diepoxide (3.2 g) were added to this resultant solution, which was then stirred at 70° C. for 14 hours. After this stirring, a resultant reaction product was washed with water, dehydrated, and then purified by distillation, so that 60 g of Compound 2 was obtained.

Compound 2 was a colorless, transparent liquid, and had a density of 1.74 g/cm$^3$ at 20° C. Identification results of Compound 1 by NMR are shown below.

$^{19}$F-NMR (solvent; none, reference substance: OCF$_2$CF$_2$CF$_2$O in the product [−129.7 ppm])

δ=−129.7 ppm [18F, —OCF$_2$CF$_2$CF$_2$O—]

δ=−83.7 [36F, —OCF$_2$CF$_2$CF$_2$O—]

δ=−124.2 ppm [8F, —OCF$_2$CF$_2$CH$_2$OCH$_2$CH(OH)CH$_2$CH$_2$CH$_2$CH$_2$CH(OH)CH$_2$—, —OCF$_2$CF$_2$CH$_2$OCH$_2$CH(OH)CH$_2$OH]

δ=−86.5 ppm [8F, —OCF$_2$CF$_2$CH$_2$OCH$_2$CH(OH)CH$_2$CH$_2$CH$_2$CH$_2$CH(OH)CH$_2$—, —OCF$_2$CF$_2$CH$_2$OCH$_2$CH(OH)CH$_2$OH]

The results from $^{19}$F-NMR proved that m=9.3 as to Compound 2. Compound 2 was found to have a number average molecular weight of 3934; therefore, Noll/(Mn/1500)=2.3.

$^1$H-NMR (solvent: none, reference substance: D2O)

δ=3.2 ppm to 3.8 ppm [30H, HOCH$_2$CH(OH)CH$_2$OCH$_2$CF$_2$CF$_2$O(CF$_2$CF$_2$CF$_2$O)$_z$CF$_2$CF$_2$CH$_2$—OCH$_2$CH(OH)CH$_2$CH$_2$CH$_2$CH$_2$CH(OH)CH$_2$O—CH$_2$CF$_2$CF$_2$O(CF$_2$CF$_2$CF$_2$O)$_z$CF$_2$CF$_2$CH$_2$OCH$_2$CH(OH)CH$_2$OH]

δ=1.1 ppm [8H, HOCH$_2$CH(OH)CH$_2$OCH$_2$CF$_2$CF$_2$O(CF$_2$CF$_2$CF$_2$O)$_z$CF$_2$CF$_2$CH$_2$—OCH$_2$CH(OH)CH$_2$CH$_2$CH$_2$CH$_2$CH(OH)CH$_2$O—CH$_2$CF$_2$CF$_2$O(CF$_2$CF$_2$CF$_2$O)$_z$CF$_2$CF$_2$CH$_2$OCH$_2$CH(OH)CH$_2$OH]

Application to a magnetic disk was carried out in a manner similar to that for Example 1 except that Compound 2 thus obtained was dissolved in water at a concentration of 0.35 g/L.

Example 6

A lubricant solution obtained in Example 2-5 was applied to a magnetic disk in a manner similar to that for Example 1 except that the temperature of the lubricant solution was set to 80° C.

Example 7

Compound 2 was dissolved, at the same concentration as in Example 5, in a mixed solvent obtained by mixing water and acetone in a volume ratio of 50:50, so that a lubricant solution in Example 7 was prepared. This lubricant solution was applied to a magnetic disk in a manner similar to that for Example 5 except that the lubricant solution thus prepared was used.

Example 8

Compound 2 was dissolved, at the same concentration as in Example 5, in a mixed solvent obtained by mixing water and acetone in a volume ratio of 50:50, so that a lubricant solution in Example 8 was prepared. This lubricant solution thus obtained was applied to a magnetic disk in a manner similar to that for Example 1 except that the temperature of the lubricant solution thus prepared was set to 50° C.

Comparative Example 1

Compound 1 was dissolved, at the same concentration as in Example 1, in Vertrel-XF available from Chemours- Mitsui Fluoroproducts Co., Ltd., so that a lubricant solution in Comparative Example 1 was prepared. This lubricant solution was applied to a magnetic disk in a manner similar to that for Example 1 except that the lubricant solution thus prepared was used.

Comparative Example 2

Compound 1 was dissolved, at the same concentration as in Example 1, in ASAHIKLIN AK-225G available from AGC, so that a lubricant solution in Comparative Example 2 was prepared. This lubricant solution was applied to a magnetic disk in a manner similar to that for Example 1 except that the lubricant solution thus prepared was used.

Comparative Example 3

Compound 2 was dissolved, at the same concentration as in Example 5, in Vertrel-XF available from Chemours-Mitsui Fluoroproducts Co., Ltd., so that a lubricant solution in Comparative Example 3 was prepared. This lubricant solution was applied to a magnetic disk in a manner similar to that for Example 1 except that the lubricant solution thus prepared was used.

Comparative Example 4

Compound 2 was dissolved, at the same concentration as in Example 5, in ASAHIKLIN AK-225G available from AGC, so that a lubricant solution in Comparative Example 4 was obtained. This lubricant solution was applied to a magnetic disk in a manner similar to that for Example 1 except that this lubricant solution was used.

[Results of Film Thickness Evaluation on Lubricant Layers]

Table 1 shows solvents, GWPs for the respective solvents, application temperatures, and the results of film thickness evaluation on lubricant layers that were formed.

lubricant solution in accordance with an embodiment of the present invention makes it possible to form a lubricant layer in a manner that places lower load on the environment than conventional lubricant solutions.

INDUSTRIAL APPLICABILITY

A lubricant solution in accordance with an aspect of the present invention is suitable for use as a lubricant solution for a magnetic disk.

REFERENCE SIGNS LIST

1 Magnetic disk
2 Lubricant layer
3 Protective film layer (protective layer)
4 Recording layer
5 Lower layer
6 Soft magnetic lower layer
7 Adhesive layer
8 Non-magnetic substrate

The invention claimed is:
1. A lubricant solution comprising: a perfluoropolyether compound dissolved in water, wherein the perfluoropolyether compound satisfies Expression (I) below:

$$N_{OH}/(Mn/1500) \geq 2 \quad (I),$$

where $N_{OH}$ represents the number of hydroxyl groups contained per molecule of the perfluoropolyether compound and Mn represents a number average molecular weight of the perfluoropolyether compound; and wherein the perfluoropolyether compound has a structure represented by Formula (2) below:

$$R^1\text{—}R^2\text{—}R^3 \quad (2)$$

$R^1$ is —F, —CH$_2$OH, —CH$_2$OCH$_2$CH(OH)CH$_2$OCH$_2$CH(OH)CH$_2$OH, —CH$_2$O(CH$_2$)$_g$OH, 

TABLE 1

| | Lubricant | Solvent | AT (° C.) | Solubility | LC (g/L) | GWP (100-Year time horizon) | Film Thickness (nm) |
|---|---|---|---|---|---|---|---|
| Example 1 | Compound 1 | Water | 25 | Soluble | 0.09 | Outside scope of measurement | 1.2 |
| Example 2 | Compound 1 | | 80 | Soluble | 0.09 | | 1.3 |
| Example 3 | Compound 1 | Water/ | 25 | Soluble | 0.09 | | 1.1 |
| Example 4 | Compound 1 | Acetone | 50 | Soluble | 0.09 | | 1.2 |
| Example 5 | Compound 2 | Water | 25 | Soluble | 0.35 | | 1.3 |
| Example 6 | Compound 2 | | 80 | Soluble | 0.35 | | 1.4 |
| Example 7 | Compound 2 | Water/ | 25 | Soluble | 0.35 | | 0.9 |
| Example 8 | Compound 2 | Acetone | 50 | Soluble | 0.35 | | 1.1 |
| Comparative Example 1 | Compound 1 | VertrelXF | 25 | Insoluble | 0.09 | 1640 | Unmeasurable |
| Comparative Example 2 | Compound 1 | AK255G | 25 | Soluble | 0.09 | 595 | 1.0 |
| Comparative Example 3 | Compound 2 | VertrelXF | 25 | Soluble | 0.35 | 1640 | 1.1 |
| Comparative Example 4 | Compound 2 | AK255G | 25 | Soluble | 0.35 | 595 | 0.9 |

Explanation of abbreviations in Table 1:
AT: Application Temperature;
LC: Lubricant Concentration As is clear from Table 1, Examples 1 to 8 do not significantly differ from Comparative Examples 1 to 4 in film thickness. This means that the lubricant solutions in Examples 1 to 8, which contain water as a solvent, have the same functionality as the lubricant solutions that contain a fluorine solvent. It has therefore been confirmed that the —CH$_2$OCH$_2$CH(OH)CH$_2$OC$_{12}$H$_9$O, —CH$_2$OCH$_2$CH(OH)CH$_2$OC$_{10}$H$_7$, or CH$_2$OCH$_2$CH(OH)CH$_2$OC$_6$H$_4$—R$^4$;

$R^3$ is —F, —CH$_2$OH, —CH$_2$—O—CH$_2$—CH(OH)CH$_2$—OH, —CH$_2$OCH$_2$CH(OH)CH$_2$OCH$_2$CH(OH)CH$_2$OH, —CH$_2$O(CH$_2$)$_g$OH, —CH$_2$OCH$_2$CH(OH)

$CH_2OC_{12}H_9O$, $-CH_2OCH_2CH(OH)CH_2OC_{10}H_7$, or $CH_2OCH_2CH(OH)CH_2OC_6H_4-R^4$;

g is a real number of 1 to 10;

$R^4$ is a hydrogen atom, a hydroxyl group, an alkoxy group including one to four carbon atoms, an amino group, or an amide residue; and $R^2$ is a perfluoropolyether skeleton structure represented by Formula (1) below:

$$-(CF_2)_x(CF(CF_3))_yO(CF_2O)_z(CF_2CF_2O)_l(CF_2CF_2CF_2O)_m(CF_2CF_2CF_2CF_2O)_n(CF(CF_3)CF_2O)_o-(CF(CF_3))_y(CF_2)_x- \quad (1),$$

where x is a real number of 0 to 3, y is a real number of 0 to 1, and l, m, n, and o are each a real number of 0 to 15 such that either x or y is a real number of not less than 1 and at least any one of m, n, and o is a real number of not less than 1.

2. The lubricant solution according to claim 1, further comprising an organic solvent, wherein the organic solvent is contained in an amount of not more than 40 vol % relative to a solvent of the lubricant solution.

3. The lubricant solution according to claim 1, wherein the lubricant solution contains a fluorine solvent in an amount of not more than 20 wt %.

4. A magnetic disk comprising:
a recording layer;
a protective layer disposed on the recording layer; and
a lubricant layer disposed on the protective layer,
the lubricant layer comprising the lubricant solution according to claim 1.

5. A method for producing a magnetic disk including a recording layer, a protective layer disposed on the recording layer, and a lubricant layer disposed on the protective layer, the method comprising:
a step of producing a lubricant solution by dissolving a perfluoropolyether compound in water, wherein the perfluoropolyether compound satisfies Expression (I) below:

$$N_{OH}/(Mn/1500) \geq 2 \quad (I),$$

where $N_{OH}$ represents the number of hydroxyl groups contained per molecule of the perfluoropolyether compound and Mn represents a number average molecular weight of the perfluoropolyether compound;

wherein the perfluoropolyether compound is represented by Formula (2) or (3) below:

$$R^1-R^2-R^3 \quad (2),$$

$$R^{1'}-R^5-R^6-R^7-R^{3'} \quad (3),$$

$R^1$ is $-F$, $-CH_2OH$, $-CH_2OCH_2CH(OH)CH_2OCH_2CH(OH)CH_2OH$, $-CH_2O(CH_2)_gOH$, $-CH_2OCH_2CH(OH)CH_2OC_{12}H_9O$, $-CH_2OCH_2CH(OH)CH_2OC_{10}H_7$, or $CH_2OCH_2CH(OH)CH_2OC_6H_4-R^4$, $R^3$ is $-F$, $-CH_2OH$, $-CH_2-O-CH_2-CH(OH)CH_2-OH$, $-CH_2OCH_2CH(OH)CH_2OCH_2CH(OH)CH_2OH$, $-CH_2O(CH_2)_gOH$, $-CH_2OCH_2CH(OH)CH_2OC_{12}H_9O$, $-CH_2OCH_2CH(OH)CH_2OC_{10}H_7$, or $CH_2OCH_2CH(OH)CH_2OC_6H_4-R^4$;

$R^2$ is a perfluoropolyether skeleton structure represented by Formula (1) below:

$$-(CF_2)_x(CF(CF_3))_yO(CF_2O)_z(CF_2CF_2O)_l(CF_2CF_2CF_2O)_m(CF_2CF_2CF_2CF_2O)_n(CF(CF_3)CF_2O)_o-(CF(CF_3))_y(CF_2)_x- \quad (1),$$

where x is a real number of 0 to 3, y is a real number of 0 to 1, and l, m, n, and o are each a real number of 0 to 15 such that either x or y is a real number of not less than 1 and at least any one of m, n, and o is a real number of not less than 1, $R^5$ and $R^7$ are an organic group having a perfluoropolyether skeleton, $R^{1'}$ and $R^{3'}$ are, independently of each other, $-F$, $-CH_2OH$, $-CH_2OCH_2CH(OH)CH_2OH$, $-CH_2OCH_2CH(OH)CH_2OCH_2CH(OH)CH_2OH$, $-CH_2O(CH_2)_gOH$, $-CH_2OC_{12}H_9O$, $-CH_2OCH_2CH(OH)CH_2OC_{10}H_7$, or $CH_2OCH_2CH(OH)CH_2OC_6H_4-R^4$, g is a real number of 1 to 10, and $R^4$ is a hydrogen atom, a hydroxyl group, an alkoxy group including one to four carbon atoms, an amino group, or an amide residue, and $R^6$ is an aliphatic hydrocarbon group or an aromatic hydrocarbon group; and a step of forming a lubricant layer by placing, on an exposed surface of the protective layer of a stack of the recording layer and the protective layer, the lubricant solution.

6. A lubricant solution comprising: a perfluoropolyether compound dissolved in water, wherein the perfluoropolyether compound satisfies Expression (I) below:

$$N_{OH}/(Mn/1500) \geq 2 \quad (I),$$

where $N_{OH}$ represents the number of hydroxyl groups contained per molecule of the perfluoropolyether compound and Mn represents a number average molecular weight of the perfluoropolyether compound; and wherein the perfluoropolyether compound has a structure represented by Formula (23) below:

$$R^{1'}-R^5-R^6-R^7-R^{3'} \quad (3),$$

where $R^5$ and $R^7$ each are an organic group having a perfluoropolyether skeleton, $R^{1'}$ and $R^{3'}$ are, independently of each other, $-F$, $-CH_2OH$, $-CH_2OCH_2CH(OH)CH_2OH$, $-CH_2OCH_2CH(OH)CH_2OCH_2CH(OH)CH_2OH$, $-CH_2O(CH_2)_gOH$, $-CH_2OCH_2CH(OH)CH_2OC_{12}H_9O$, $-CH_2OCH_2CH(OH)CH_2OC_{10}H_7$, or $CH_2OCH_2CH(OH)CH_2OC_6H_4-R^4$, g is a real number of 1 to 10, and $R^4$ is a hydrogen atom, a hydroxyl group, an alkoxy group including one to four carbon atoms, an amino group, or an amide residue, and $R^6$ is an aliphatic hydrocarbon group or an aromatic hydrocarbon group.

7. The lubricant solution according to claim 6, wherein $R^5$ and $R^7$ each have a structure of Formula (1) below:

$$-(CF_2)_x(CF(CF_3))_yO(CF_2O)_z(CF_2CF_2O)_l(CF_2CF_2CF_2O)_m(CF_2CF_2CF_2CF_2O)_n(CF(CF_3)CF_2O)_o-(CF(CF_3))_y(CF_2)_x- \quad (1),$$

where x is a real number of 0 to 3, y is a real number of 0 to 1, and z, l, m, n, and o are each a real number of 0 to 15 such that either x or y is a real number of not less than 1 and at least any one of z, l, m, n, and o is a real number of not less than 1.

8. The lubricant solution according to claim 6, further comprising an organic solvent, wherein the organic solvent is contained in an amount of not more than 40 vol % relative to a solvent of the lubricant solution.

9. The lubricant solution according to claim 6, wherein the lubricant solution contains a fluorine solvent in an amount of not more than 20 wt %.

10. A magnetic disk comprising:
a recording layer;
a protective layer disposed on the recording layer; and
a lubricant layer disposed on the protective layer,
the lubricant layer comprising the lubricant solution according to claim 6.

* * * * *